United States Patent [19]
Eguchi et al.

[11] Patent Number: 5,383,032
[45] Date of Patent: Jan. 17, 1995

[54] IMAGE PROCESSING SYSTEM

[75] Inventors: Kazuhiro Eguchi, Kasuga; Hiroshi Imabayashi, Fukuoka, both of Japan

[73] Assignee: Matsushita Electric Industrial Co., Ltd., Osaka, Japan

[21] Appl. No.: 888,711

[22] Filed: May 27, 1992

[30] Foreign Application Priority Data

May 28, 1991 [JP] Japan .................................. 3-123631
May 28, 1991 [JP] Japan .................................. 3-123633

[51] Int. Cl.⁶ .................................................. H04N 1/46
[52] U.S. Cl. ........................................ 358/448; 358/452
[58] Field of Search ............. 358/448, 452, 455, 456, 358/461, 467

[56] References Cited

U.S. PATENT DOCUMENTS

| | | | |
|---|---|---|---|
| 4,472,736 | 9/1984 | Ushio et al. | 358/75 |
| 4,654,722 | 3/1987 | Alkofer | 358/284 |
| 4,731,671 | 3/1988 | Alkofer | 358/284 |
| 4,811,239 | 3/1989 | Tsao | 358/284 |

*Primary Examiner*—Vit W. Miska
*Attorney, Agent, or Firm*—Lowe, Price, LeBlanc & Becker

[57] ABSTRACT

An image processing system which partitions an input image data into pixel density data representing a density of each of pixels of the input image and stores the pixel density data. The pixel density distribution of the input image is then computed by counting pixels of each density represented by the stored pixel density data. Accumulation data is then generated corresponding to each density represented by the pixel density data, and a data curve is generated and output representing accumulation data. The data curve representing accumulation data corresponding to each density represented by the pixel density data obtained from the input image data is read and used to correct the converted pixel density data by employing the data curve as a density correction curve indicating a relation between the pixel density data and a density data output. Further, the accumulation data corresponding to each density represented by the pixel density data represents a value proportional to the number of pixels having densities ranging from the lowest density to a density corresponding thereto.

7 Claims, 9 Drawing Sheets

AD: ACCUMULATION DATA

COUNTER REGION

ROT : READING-OPERATION TERMINATING

ROI : READING-OPERATION INITIATING

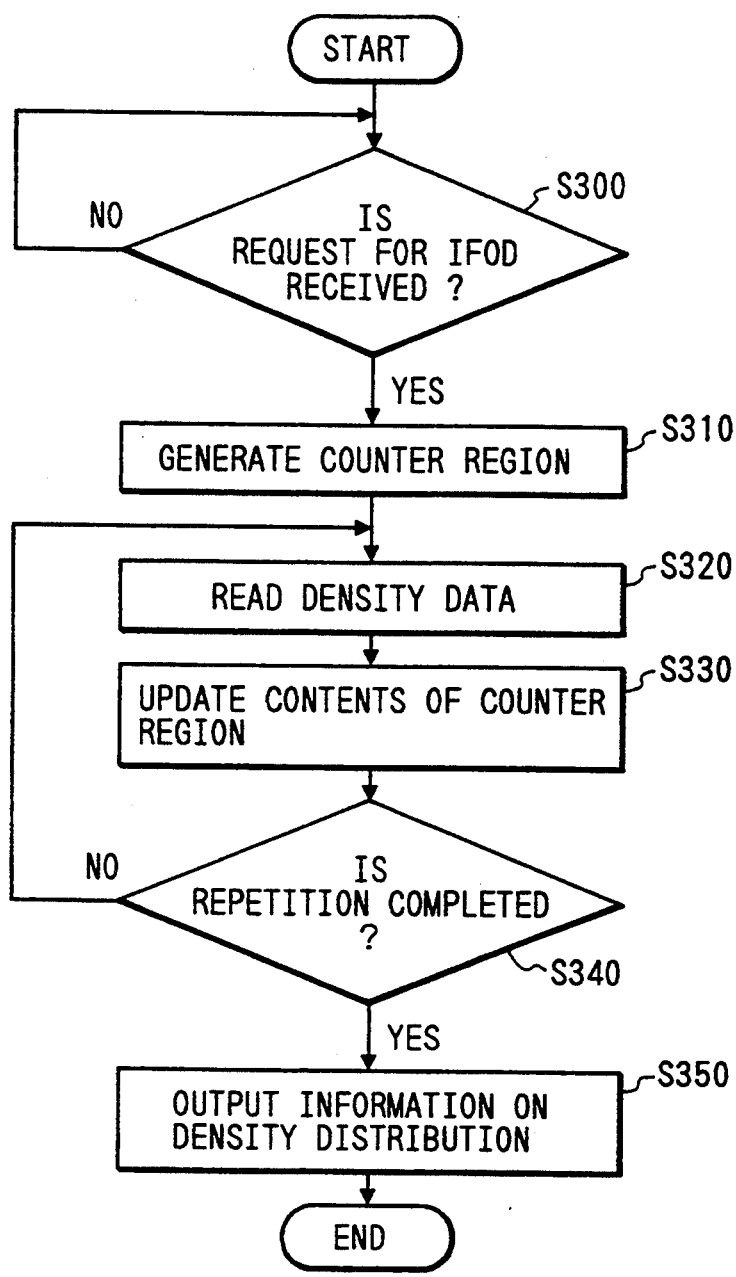

IMAGE PROCESSING SYSTEM

BACKGROUND OF THE INVENTION

1. Field of The Invention

This invention relates to an image processing system for performing a processing such as a tone correction on image data obtained by optically reading a picture or the like and thereafter outputting processed image data.

2. Description of The Related Art

In recent years, with advance of image processing techniques, an image processing system, which can read image data of a picture or the like and perform various processings on the image data and edit the image data by, for example, "pasting" or placing an image represented by the image data on a document, has come to require a variety of functions and an improvement in operability.

A conventional image processing system has a function of a tone correction, by which a tone of read image data is converted into another tone arbitrarily indicated by an operator. In such a case, a desired correction rate or degree can be set by first displaying a curve graph (hereunder sometimes referred to as a tone curve or as a tone correction curve), in which tone levels (namely, densities) of input image data are plotted in abscissa (namely, in horizontal axis) and tone levels of output image data obtained by performing a tone correction on the tone of the input image data are plotted in ordinate (namely, in vertical axis), as illustrated in FIG. 10 and next modifying the tone curve by using an input means such as a mouse. In case of FIG. 10, a tone curve 1 corresponds to a case where a tone level of output image data is equal to a tone level of corresponding input image data (namely, output image data is obtained from input image data without any conversion or modification). Further, as shown in FIG. 10, a tone curve 2 is entirely lower than the tone curve 1. Thus, in case of employing the tone curve 2, an output image represented by the output image data is lighter than an input image represented by the input image data. In contrast, a tone curve 3 is entirely higher than the tone curve 1. Thus, in case of employing the tone curve 3, an output image represented by the output image data is darker than an input image represented by the input image data. Further, a portion of an output image, which is represented by tone levels of a steep portion of a tone curve, is enhanced in comparison with a corresponding input image. Conversely, another portion of the output image, which is represented by tone levels of a gentle portion of the tone curve, is blurred or scumbled in comparison with the corresponding input image.

Incidentally, as above described, the setting of a tone curve can be freely performed by an operator according to uses of image data (namely, purposes for which the image data is used). However, in case where an original or input image (hereunder sometimes referred to as a draft) is a photograph, densities of the original image vary with a subject (namely, an object to be photographed), conditions of a photographing thereof and conditions of development of a film. It is, therefore, necessary for obtaining an output image, which is most suitable for uses thereof, to set a tone curve for each draft.

However, in case where a tone curve is set by the conventional image processing system with the intention of a tone correction, an operator is compelled to measure densities of pixels of an original image by using, for instance, a densitometer and repeat trial settings of a tone curve in view of a distribution of measured densities in the original image. Such an operation calls for wide experience and great skill. Thus, it is highly required for an image processing system to have a function, by which operability of setting a tone curve is improved.

SUMMARY OF THE INVENTION

It is, accordingly, an object of the present invention to provide an image processing system in which a tone correction curve to be employed as a reference for performing a tone correction on read density data (namely, image data) of each of pixels of an input image can be easily set.

Moreover, it is another object of the present invention to provide a method for setting a density correction curve, by which preferable results of a density correction can be obtained without any modification thereof.

To achieve the forgoing object and in accordance with an aspect of the present invention, there is provided an image processing system, which comprises an input means for receiving image data representing an input image, converting means, coupled to the input means, for partitioning the input image data into pixel density data representing a density of each of pixels of the input image, storage means, coupled to the converting means, for storing the pixel density data, density distribution computing means, coupled to the storage means, for computing a pixel density distribution of the input image by counting pixels of each density represented by the pixel density data stored in the storage means, graphing means, coupled to the density distribution computing means for generating accumulation data corresponding to each density represented by the pixel density data, and generating and outputting a data curve representing accumulation data, and correction means, coupled to the graphing means and the storage means, for reading the data curve representing accumulation data corresponding to each density represented by the pixel density data obtained from the input image data and for correcting the pixel density data converted by the converting means, by employing the data curve as a density correction curve indicating a relation between the pixel density data and a density data output. Further, the accumulation data corresponding to each density represented by the pixel density data represents a value proportional to the number of pixels having densities ranging from the lowest density to a density corresponding thereto.

In accordance with another aspect of the present invention, there is provided an image processing system which comprises input means for receiving image data representing an input image, converting means, coupled to the input means, for partitioning the input image data into pixel density data representing a density of each of pixels of the input image, storage means, coupled to the converting means, for storing the pixel density data, density distribution computing means, coupled to the storage means, for computing a pixel density distribution of the input image by counting pixels of each density represented by the pixel density data stored in the storage means, display means, coupled to the density distribution computing means for displaying a graph of a density correction curve indicating a relation between input density data and density data to be output as a result of a density correction, and control means, coupled to the display means and the storage means, for generating accumulation data corresponding to each density represented by the pixel density data, and generating and outputting a data curve representing the accumulation data and controlling the display means in such a manner to display the curve representing the accumulation data and the density correction curve in the same graph, wherein the accumulation data corresponding to each density represented by the pixel density data represents a value proportional to the number of pixels having densities ranging from the lowest density to a density corresponding thereto.

In accordance with still another aspect of the present invention, there is provided an image processing method which comprises the steps of receiving image data representing an input image, partitioning the input image data into pixel density data representing a density of each of pixels of the input image, storing the pixel density data, counting pixels of each density represented by the pixel density data stored in the storage means, generating accumulation data corresponding to each of the densities and represents values respectively proportional to the numbers of pixels having densities of from the lowest one of the densities to a density corresponding thereto, as a density data correction curve, and correcting the read density data of each of the pixels according to the stored density data correction curve.

Thus, a curve representing accumulation data obtained from the distribution of densities read from a draft and a density correction curve indicating a relation between input density data (namely, density data read from the draft) and output density data (namely, density data obtained by converting the input density data) are displayed in the same graph. Thereby, a tone curve, which is most suitable for a tone correction, can be set. Moreover, a setting of such a tone curve can be easily effected. Furthermore, an image processing system and a method of the present invention can eliminate dispersion of output density data obtained as a result of conversion of input density data, which occurs due to the differences in experience and skill among operators who set a tone curve for a tone correction in the conventional image processing system.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 14 is a flowchart of a program for illustrating an operation of the CPU 10 of FIG. 2 when computing the distribution of the densities represented by the image data and the accumulation data.

DETAILED DESCRIPTION OF THE PREFERRED EMBODIMENT

Hereinafter, the preferred embodiment of the present invention will be described in detail by referring to the accompanying drawings.

Figure 1:
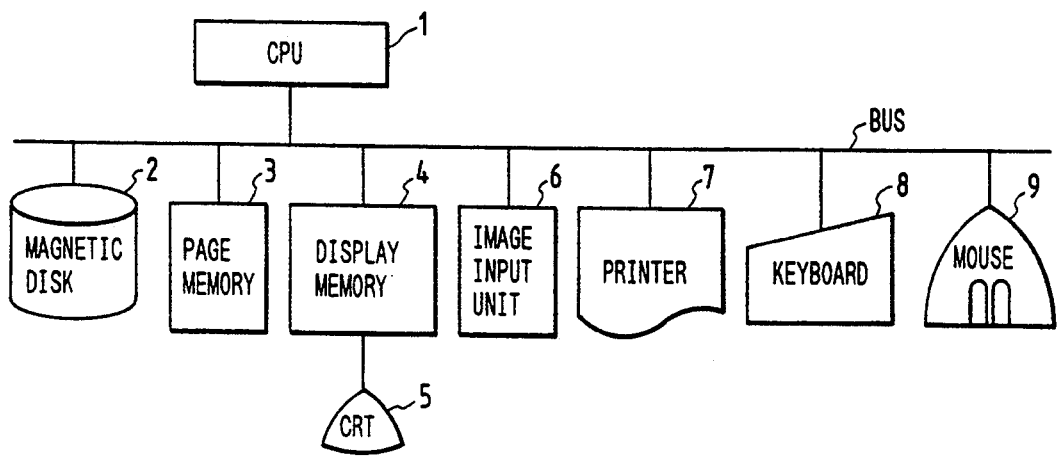
FIG. 1 is a schematic block diagram for illustrating the configuration of an image editing system embodying the present invention.

FIG. 1 is a schematic block diagram for illustrating the configuration of an image editing system embodying the present invention. Reference numeral 1 designates a CPU for controlling the system and processing data; 2 a magnetic disk and drive unit (hereunder referred to simply as a magnetic disk) for storing programs and data; 3 what is called a page memory; 4 a memory for displaying a graph or the like (hereunder sometimes referred to as a display memory); 5 a cathode-ray-tube display unit (hereunder sometimes referred to simply as a CRT); 6 an image input unit; 7 a printer; 8 a keyboard; and 9 a mouse for indicating a position on a screen of the CRT 5.

Figure 2:
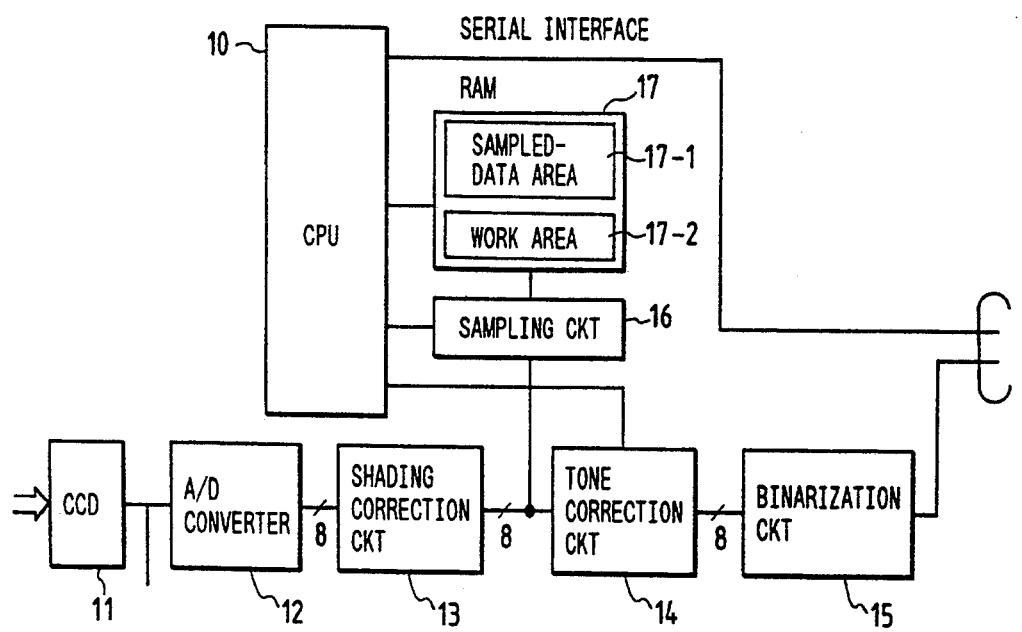
FIG. 2 is a schematic block diagram for illustrating the configuration of an image input unit of the image editing system of FIG. 1.

FIG. 2 is a schematic block diagram for illustrating the configuration of the image input unit 8 of the image editing system of FIG. 1. Reference numeral 10 denotes a CPU for controlling the image input unit 6; 11 an image sensor (hereunder referred to as a CCD) for outputting an analog voltage signal in response to light incident thereto by converting the intensity of the incident light to the magnitude of a voltage (namely, the level of an analog voltage); 12 an analog-to-digital (A/D) converter for converting an analog voltage signal output from the CCD 11 to an 8-bit digital voltage signal; 13 a shading correction circuit for correcting variation in the voltage signal due to the shading occurring in the read or input image; 14 a tone correction circuit for performing a conversion of densities represented by input or read image data by correcting the densities represented by the digital voltage signal; 15 a binarization circuit for converting the 8-bit digital voltage signal into a binary data signal representing 0 or 1 by performing a halftone-dot generation processing on the density data represented by the 8-bit digital voltage signal, which is corrected by the tone correction circuit 14; 16 a sampling circuit for sampling the density data (namely, the image data) represented by the 8-bit digital voltage signals, which are output from the shading correction circuit 13, at a predetermined rate under the control of the CPU 10; and 17 a readable/writable random access memory (hereunder abbreviated as a RAM) for storing the image data sampled by the sampling circuit 16.

Hereinafter, an image processing performed by the image editing system having the above described configuration will be described in detail.

1. READING OF IMAGE DATA

Figure 11:
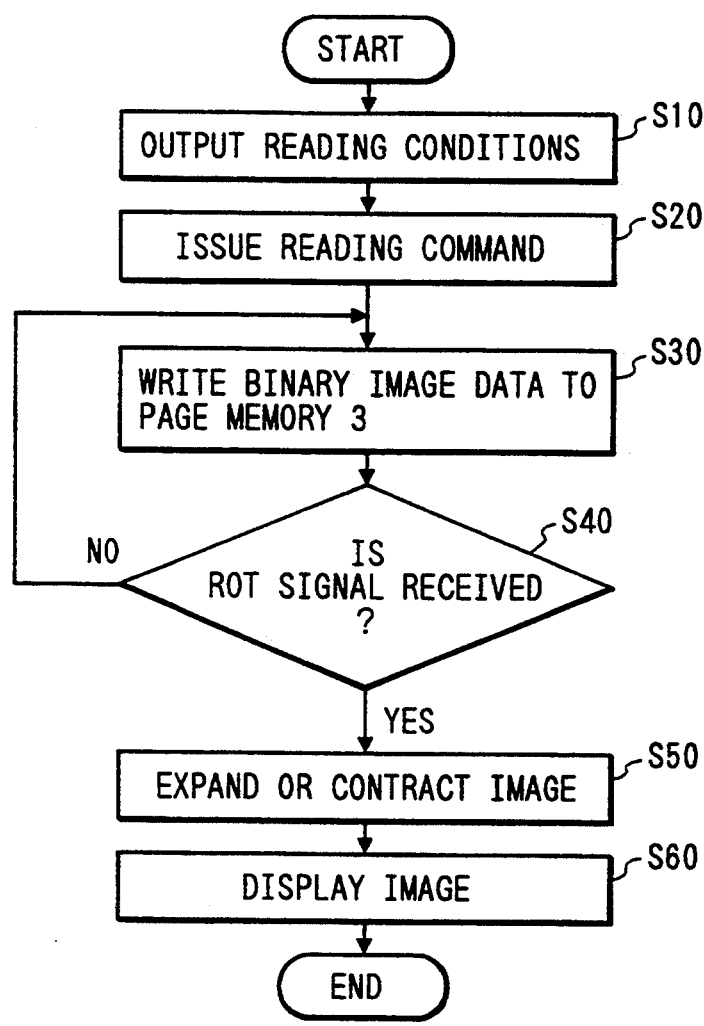
FIG. 11 is a flowchart of a program for illustrating an operation of a central processing unit (hereunder abbreviated as CPU) 1 of FIG. 1 when reading image data.
Figure 12:
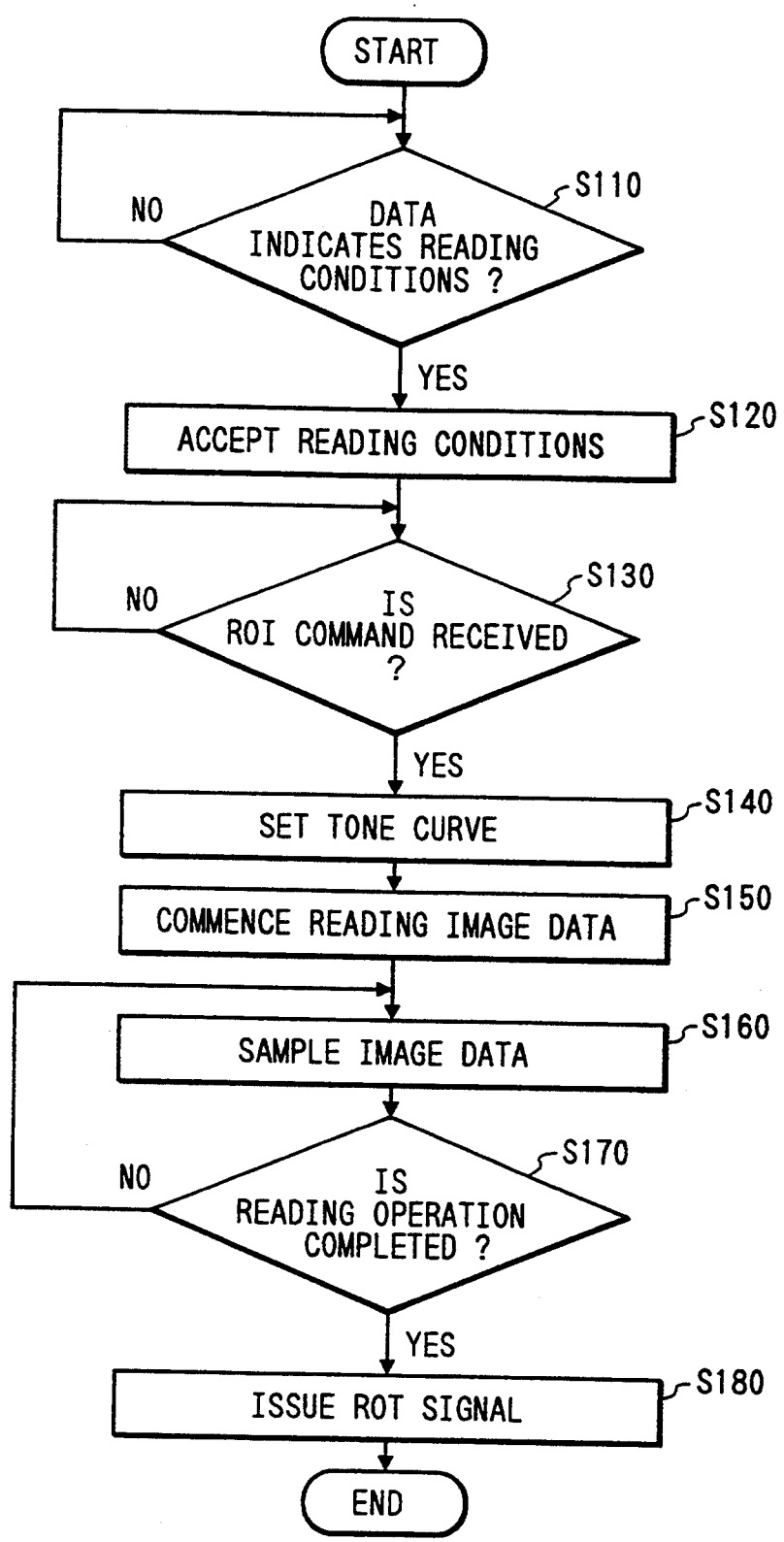
FIG. 12 is a flowchart of a program for illustrating an operation of a CPU 10 of FIG. 2 when reading image data.

First, as shown in the flowchart of FIG. 11, the CPU 1 of the system notifies the CPU 10 of the image input unit 6 of conditions of a reading of image data, data representing the relation (hereunder sometimes referred to as the conversion relation) between the density of each pixel of an output image and that of a corresponding pixel of an input image, which is indicated by a tone curve for a tone correction or the like (hereunder sometimes referred to as reading conditions), in step S10 and subsequently issues a reading command thereto in step S20. Then, as illustrated in the flowchart of FIG. 12, the CPU 10 first checks whether or not data sent from the CPU 1 indicates the reading conditions in step S110. If such data indicates the reading conditions, the image input unit inputs or accepts such data in step S120 and subsequently, in step S130, waits for a reading-operation initiating command to be sent from the CPU 1. When receiving such a command, data representing the conversion relation, which is indicated by a tone curve for a tone correction, is set in the tone correction circuit 14 in step S140 as will be described in detail later. Then, an operation of reading image data is commenced in step S150. When starting such an operation, a draft such as a photograph is irradiated with light. Further, an input image is formed on the CCD 11 from light reflected by the draft by using a lens (not shown). Then, the reflected light is converted by the CCD 11 into an electric signal (namely, an analog voltage signal), which is further converted by the A/D converter 12 to an 8-bit digital voltage signal. Thereafter, the shading correction circuit 13 performs a correction on image data represented by the digital voltage signal. Then, 8-bit image data corrected by the circuit 13 is input to both of the tone correction circuit 14 and the sampling circuit 16. At that time, the CPU 10 indicates a predetermined sampling rate or pitch to the sampling circuit 16 in step S160. Thus a sampling of the 8-bit image data is effected in the circuit 16 at the predetermined sampling pitch. The sampled image data are stored in a sampled-data storing area (hereunder sometimes referred to as a sampled-data area) 17-1 of the RAM 17. On the other hand, the 8-bit image data obtained as a result of the tone correction is converted by the binarization circuit 15 into binary data represented by a binary data signal which is then transferred to the page memory 3 directly in step S30 of FIG. 11. Upon completion of the reading of the draft (step S170 of FIG. 12), the CPU 10 issues a reading-operation terminating signal in step S180. When the CPU 1 receives the reading-operation terminating signal, the reading operation is finished in step S40. Thereafter, in step S50, the CPU 1 performs an expansion or contraction of an image represented by the image data stored in the page memory 3 in accordance with the resolution of the CRT 5. Then, data representing the expanded or contracted image is transmitted to the display memory 4. Thus an input or read image, which is appropriately expanded or contracted, is displayed on the screen of the CRT 5 in step S60.

2. TONE CORRECTION

Figures 3, 4:
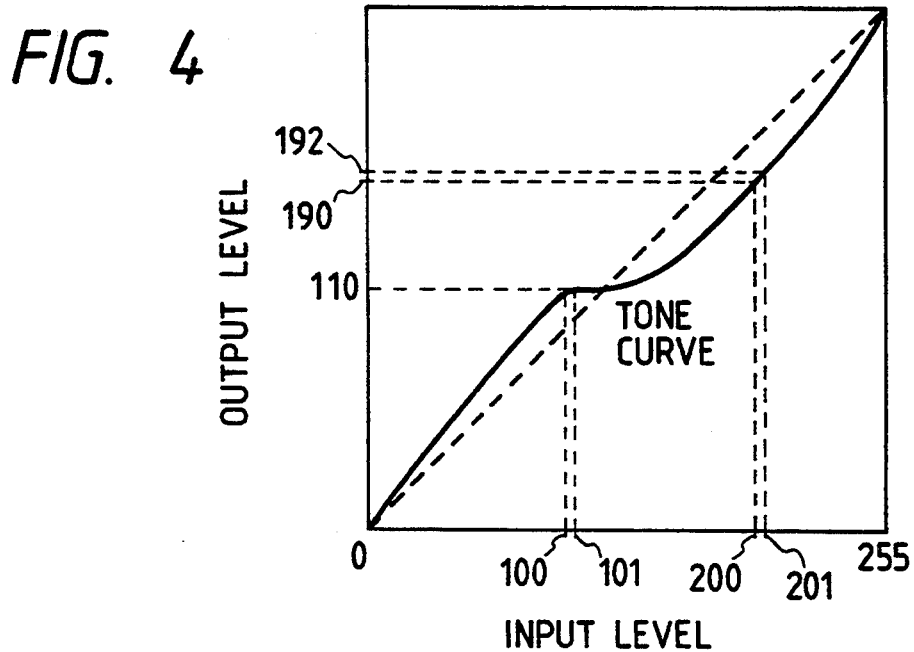
FIG. 3 is a diagram for illustrating data representing a tone curve for a tone correction.
FIG. 4 is a graph fop illustrating an example of a tone curve for a tone correction.

In the tone correction circuit 14, a RAM having a storage area of at least 256 bytes as illustrated in FIG. 3 is provided. In the storage area of this RAM, tone levels (namely, densities) represented by output image data are set by the CPU 10 at locations thereof, the addresses of which respectively have values equal to tone levels represented by input image data, at the time of initialization of the RAM prior to the reading of the input image. Namely, predetermined relation between tone levels of output image data and tone levels of input image data (namely, the conversion relation) is initially established in the storage area of the RAM by the CPU 10. For instance, in case where the conversion relation represented by a tone curve of FIG. 4 is established therein, image data indicating a tone level of 110, which are stored at locations respectively having addresses of 100 and 101 of the RAM of FIG. 3, are output therefrom correspondingly to tone levels of 100 and 101 represented by input image data. Further, in such a case, image data respectively indicating tone levels of 190 and 192, which are stored at locations respectively having addresses of 200 and 201 of the RAM of FIG. 3, are output therefrom respectively corresponding to tone levels of 200 and 201 represented by the input image data. As described above, a tone correction is performed according to the established tone curve by fetching data stored at locations of the storage area of the RAM respectively corresponding to addresses, which are indicated by tone levels represented by the input image data, and then outputting the fetched data.

3. DISPLAYING OF GRAPH OF DENSITY DISTRIBUTION AND ACCUMULATION DATA

Figure 13:
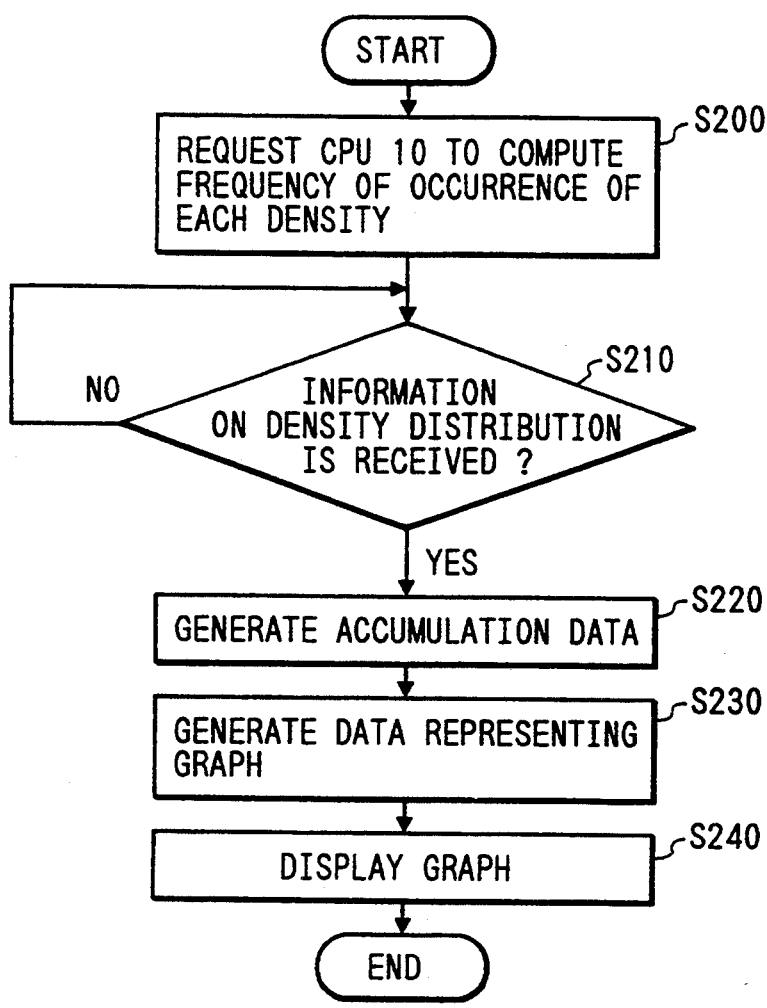
FIG. 13 is a flowchart of a program for illustrating an operation of the CPU 1 of FIG. 1 when computing the distribution of densities represented by image data and accumulation data.

As illustrated in the flowchart of FIG. 13, in step S200, the CPU 1 issues a command requesting the CPU 10 of the image input unit 6 to compute the frequency of occurrence of each density (namely, each tone level) in an input image (namely, the number of pixels having each density in the input image). In response to this, the CPU 10 generates a counter region of 256 bytes in a work area 17-2 of the RAM 17 (in steps S300 and S310 of the flowchart of FIG. 14). Then, density distribution of sampled image data stored in the sampled data area 17-1 is computed by employing densities of pixels of an input image as addresses in the counter region and using each byte of the counter region as a "counter" for counting the frequency of each density. Namely, the image data (hereunder sometimes referred to as the density data) stored in the sampled-data area 17-1 is read in step S320. Subsequently, one of values of the frequencies respectively held in the bytes (namely, the "counters" respectively corresponding to the densities) of the counter region is updated in step S330 according to the read image data. Such a process composed of the steps S320 and S330 is repeatedly performed on all of the image data stored in the sampled-data area 17-1. Upon completion of the repetition of such a process in step S340, the CPU 10 notifies the CPU 1 of information on the computed density distribution (namely, the frequencies of occurrence of the densities, which are stored in the counter region) of the input image data, in step S350. When the CPU 1 receives the information on the density distribution from the CPU 10 in step S210, the CPU 1 generates accumulation data corresponding to each of the densities, which represents a ratio of a value obtained accumulating the frequencies of occurrence of from the lowest density to the corresponding density (namely, the number of pixels of from the lowest density to the corresponding density) to the total number of pixels corresponding to the sampled image data and stores the accumulation data in the magnetic disk 2 in step S220. Further, the CPU 1 stores data representing a histogram, of which the horizontal axis denotes the densities (in this case, 256 density levels) of pixels of the draft or input image and the vertical axis designates the frequency of occurrence of each of the densities, as well as data representing a curve graph of the accumulation data, of which the horizontal axis denotes the densities and the vertical axis designates the accumulation data corresponding to each of the densities, in the display memory 4 in step S230. Then, the CPU 1 displays the histogram and the curve representing the accumulation data in the same graph on the screen of the CRT 5 in step S240.

Figures 7, 8:
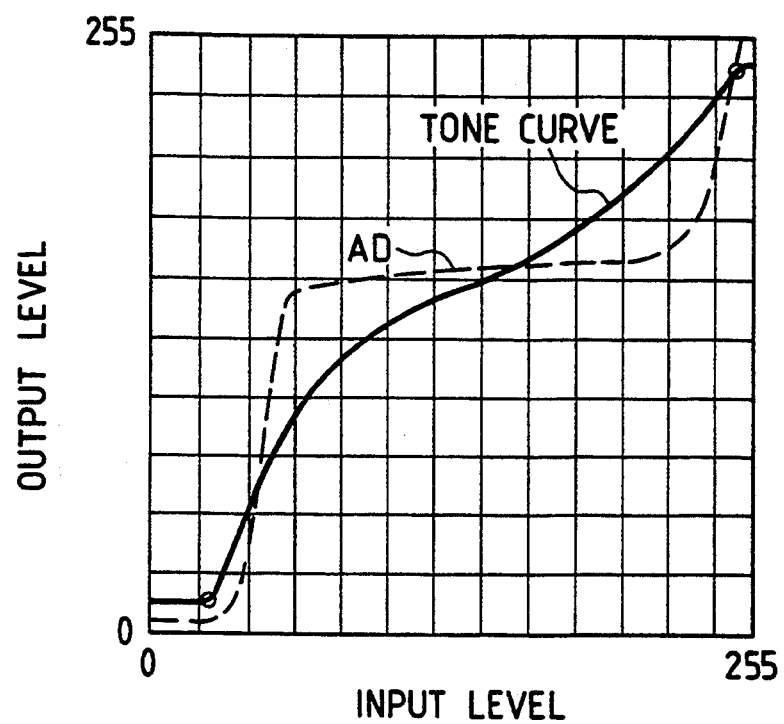
FIG. 7 is a diagram for showing an example of a display of a curve representing the accumulation data and a tone curve for a tone correction on a screen to be used for setting the tone curve.
FIG. 8 is a diagram for illustrating data representing an initial tone curve for a tone correction.
Figure 9:
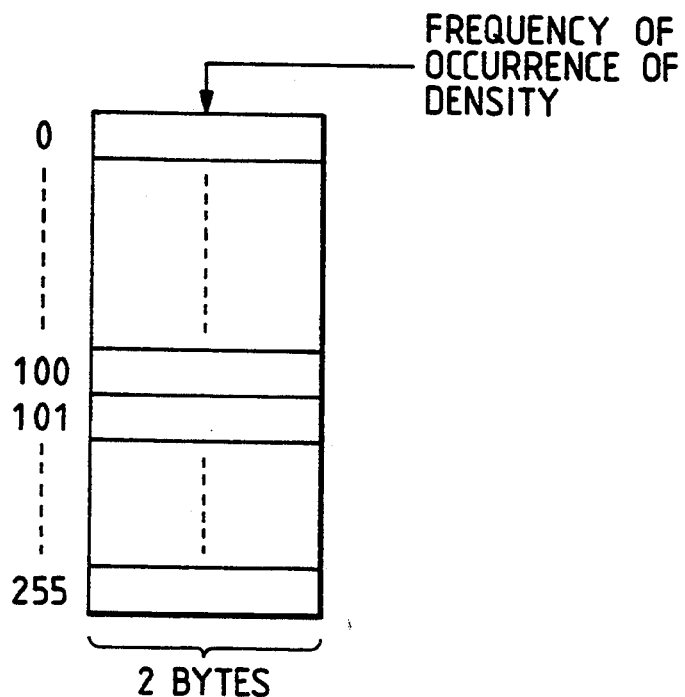
FIG. 9 is a diagram for illustrating the structure of storage areas to be used as a counter for computing the distribution of the densities represented by the image data.
Figure 10:
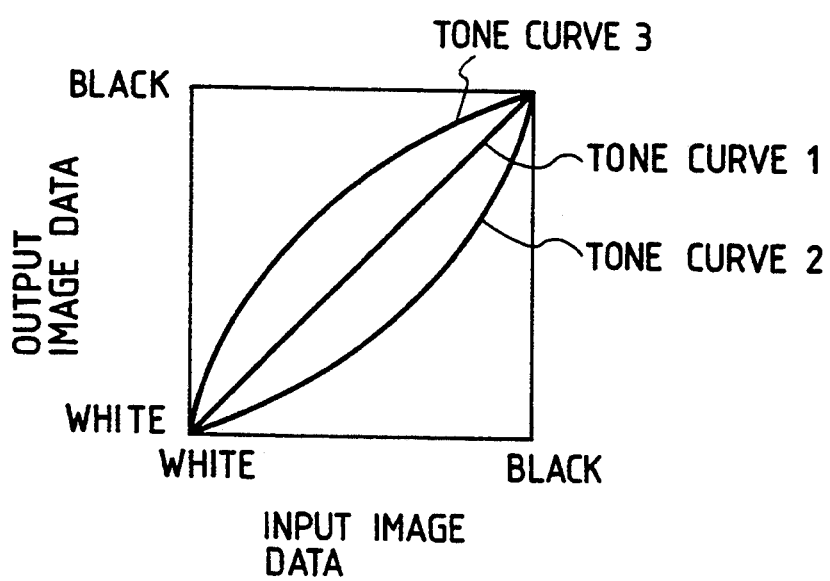
FIG. 10 is a graph for showing an example of a tone curve for a tone correction.

As is apparent from FIG. 8, the curve graph of the accumulation data is steep, namely, has a large gradient at a portion thereof corresponding to the densities, of which the frequencies of occurrence are large. In contrast with this, the curve graph of the accumulation data is gentle, namely, has a small gradient at another portion thereof corresponding to the densities, of which the frequencies of occurrence are small. Therefore, if this curve is employed as a tone curve for a tone correction, change in tone of a portion having the densities, of which the frequencies of occurrence are large, is enhanced. Further, change in tone of a portion having the densities, of which the frequencies of occurrence are small, is dulled. Thus, as a whole, the density distribution is smoothed. Consequently, this curve is very effective in achieving a most suitable tone correction. Hence, data obtained by multiplying the accumulation data corresponding to each of the densities, which is stored in the magnetic disk 2, by (255/100) (namely, tone data ranging from 1 to 255, into which the accumulation data represented in terms of percent are converted) are also stored in the magnetic disk 2. When a tone curve for a tone correction is established in the system, the curve representing the accumulation data, as well as a curve to be initially displayed as an initial tentative tone curve, is displayed on the screen of the CRT as illustrated in FIG. 7. Thus an operator can perform a most suitable tone correction by setting a tone curve with reference to the displayed curve representing the accumulation data.

4. SETTING OF TONE CURVE

Figure 5:
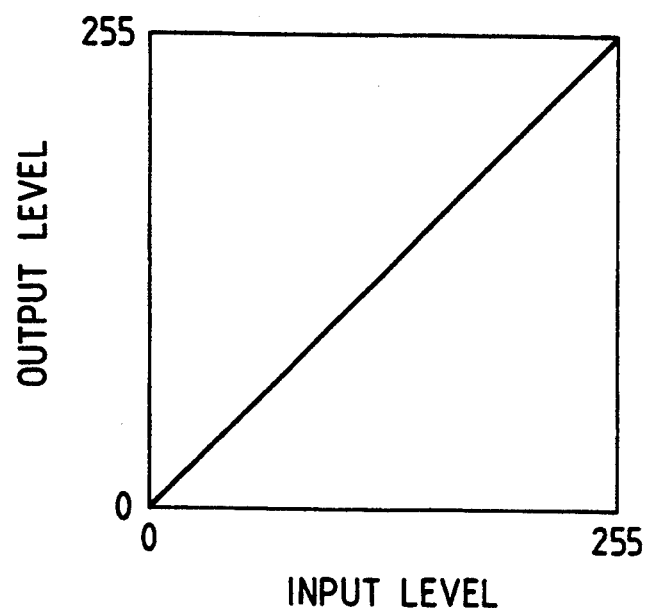
FIG. 5 is a graph for illustrating an example of an initially displayed tone curve (hereunder sometimes referred to as an initial tone curve) for a tone correction.
Figure 6:
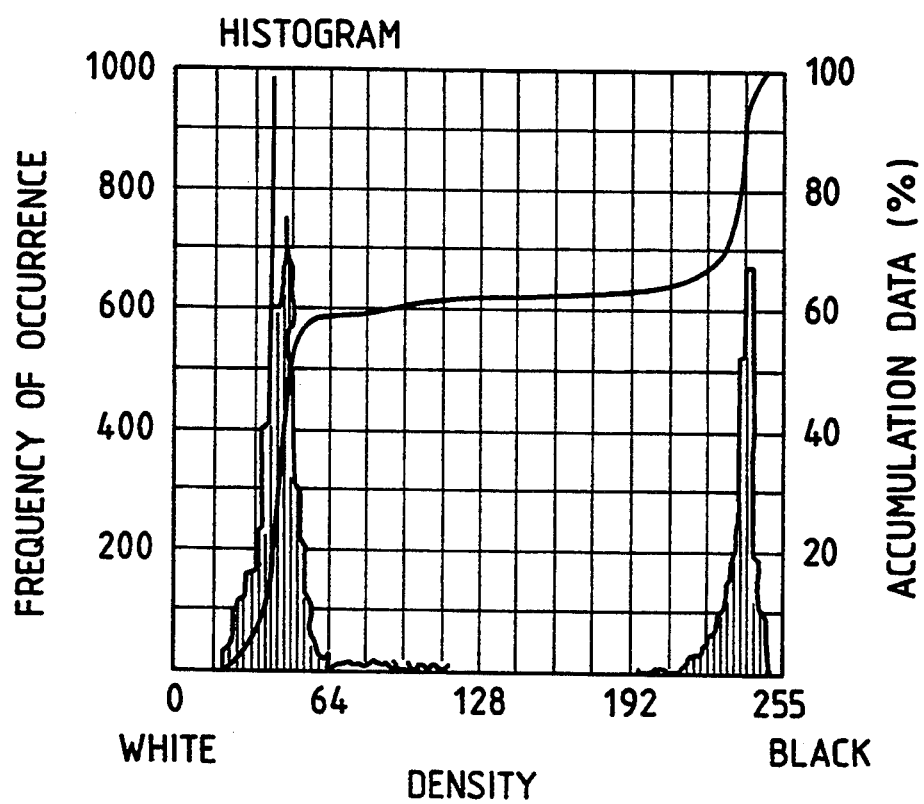
FIG. 6 is an graph for illustrating an example of a histogram showing the distribution of densities represented by image data and a curve showing accumulation data obtained from the distribution of the densities.

In the magnetic disk 2, a storage area having the same structure as the RAM of the tone correction circuit 14 does as illustrated in FIG. 8 is provided. Further, data representing an initial conversion relation indicated by the initial (tentative) tone curve is stored in this storage area of the magnetic disk 2. Incidentally, in case of this embodiment, a line graph, which indicates that the tone level (namely, the density) of each pixel of an output image is equal to that of a corresponding pixel of an input image, is set as the initial (tentative) tone curve. The CPU 1 reads density data (hereunder sometimes referred to as initial value data), which is stored in the storage area of the magnetic disk 2 according to the relation indicated by this line graph (namely, the initial tone curve), therefrom. Then the CPU 1 generates data (hereunder sometimes referred to as display data) representing a graph of the initial tone curve, of which the horizontal axis denotes the density levels (namely, addresses in the storage area of the magnetic disk 2) represented by input image data and the vertical axis designates the those represented by output image data (stored at locations having the addresses in the storage area of the magnetic disk 2), according to the initial value data. Further, the generated display data is stored in the display memory 4. Subsequently, the initial tone curve for a tone correction as illustrated in FIG. 5 is displayed on the screen of the CRT 5 according to the display data. This tone curve is modified by indicating, for examples, positions of both ends of a curved portion thereof to be modified and positions on a desired curve to be substituted for the curved portion by using the mouse 9 and executing a program employing known graphic processing techniques. Thereafter, the CPU 1 sends coordinate data representing coordinates of the modified tone curve to the CPU 10 of the image input unit 8. At that time, the coordinate data sent from the CPU 1 is set in the RAM of the tone correction circuit 14 by the CPU 10.

Incidentally, another initial tone curve may be employed instead of the line graph, because it is not necessary to make the density of each pixel of an output image equal to that of a corresponding pixel of an input image. For instance, a plurality of patterns of the tone curve may be set in the system such that an operator can select and employ one of them correspondingly to a draft or input image.

Moreover, in an initial state of the system, an initial tone curve most suitable for smoothing the image data can be obtained by reading values, which are obtained by multiplying the accumulation data as previously described in "3. DISPLAYING OF GRAPH OF DENSITY DISTRIBUTION AND ACCUMULATION DATA" by (255/100), from the magnetic disk 2 and setting the read values as the initial value data representing the initial conversion relation indicated by the initial tone curve for a tone correction.

As described above, a tone curve for a tone correction can be displayed by being made to have the same shape as the curve representing the accumulation data does, in this embodiment. Furthermore, when setting the tone curve for a tone correction, the curve representing the accumulation and the initial tone curve can be simultaneously displayed on the screen of the CRT. Thereby, an operator can easily perform a setting of a tone curve with reference to the curve graph representing the accumulation data, which is most suitable for the smoothing. Further, what is called a "trial and error" process necessary for setting a tone curve in the conventional system can be eliminated. Moreover, in the image processing system of the present invention, an operator does not require great skill in setting a tone curve for a tone correction.

Additionally, in this embodiment, 8-bit image data, which can represent 256 tone levels or densities of pixels, are first sampled and thereafter the sampled data are stored in the RAM. Thereby, the memory capacity of the RAM can be small and various information on densities of pixels and image data can be utilized after a reading thereof.

While a preferred embodiment of the present invention has been described above, it is to be understood that the present invention is not limited thereto. For example, the number of bits used for representing image data and the number of tone levels are not limited to those employed in the foregoing embodiment.

Further, other modifications will be apparent to those skilled in the art without departing from the spirit of the invention. For instance, in the foregoing embodiment, to reduce necessary memory capacity, the 8-bit image data are sampled prior to the binarization. Instead of the RAM, a mass storage may be dedicated to storing of image data. In such a case, the 8-bit image data can be stored in the mass storage without being converted to, for example, binary data.

The scope of the present invention, therefore, is to be determined solely by the appended claims.

What is claimed is:

1. An image processing system comprising:
   input means for receiving image data representing an input image;
   converting means, coupled to said input means, for partitioning said input image data into pixel density data representing a density of each of pixels of the input image;
   storage means, coupled to said converting means, for storing said pixel density data;
   density distribution computing means, coupled to said storage means, for computing a pixel density distribution of said image by counting pixels of each density represented by said pixel density data stored in said storage means;
   graphing means, coupled to said density distribution computing means for generating accumulation data corresponding to each density represented by said pixel density data, and generating and outputting a data curve representing accumulation data; and
   correction means, coupled to said graphing means and said storage means, for reading said data curve representing accumulation data corresponding to each density represented by said pixel density data obtained from said input image data and for correcting said pixel density data converted by said converting means, by employing said data curve as a density correction curve indicating a relation between said pixel density data and a density data output,
   wherein the accumulation data corresponding to each density represented by said pixel density data represents a value proportional to the number of pixels having densities ranging from the lowest density to a density corresponding thereto.

2. The image processing system as set forth in claim 1, further comprising display means for displaying a graph of a curve representing accumulation data generated by the graphing means.

3. The image processing system as set forth in claim 2, wherein the display means simultaneously displays the curve of the accumulation data generated by the graphing means and the density correction curve in the same graph.

4. An image processing system comprising:
   input means for receiving image data representing an input image;
   converting means, coupled to said input means, for partitioning said input image data into pixel density data representing a density of each of pixels of the input image;
   storage means, coupled to said converting means, for storing said pixel density data;
   density distribution computing means, coupled to said storage means, for computing a pixel density distribution of said input image by counting pixels of each density represented by said pixel density data stored in said storage means;
   display means, coupled to said density distribution computing means for displaying a graph of a density correction curve indicating a relation between input density data and density data to be output as a result of a density correction; and
   control means, coupled to said display means and said storage means, for generating accumulation data corresponding to each density represented by said pixel density data, and generating and outputting a data curve representing the accumulation data and controlling the display means in such a manner to display the curve representing the accumulation data and the density correction curve in the same graph, wherein the accumulation data corresponding to each density represented by said pixel density data represents a value proportional to the number of pixels having densities ranging from the lowest density to a density corresponding thereto.

5. The image processing system as set forth in claim 4, wherein the control means is operative to make the density correction curve accord with the curve representing the accumulation data.

6. The image processing system as set forth in claim 4, wherein the control means is operative to modify the density correction curve.

7. An image processing method comprising the steps of:
   receiving image data representing an input image;
   partitioning said input image data into pixel density data representing a density of each of pixels of the input image;
   storing said pixel density data;
   counting pixels of each density represented by said pixel density data stored in said storage means;
   generating accumulation data corresponding to each of the densities and represents values respectively proportional to the numbers of pixels having densities of from the lowest one of the densities to a density corresponding thereto, as a density data correction curve; and
   correcting the read density data of each of the pixels according to the stored density data correction curve.

* * * * *